United States Patent [19]
Tomovic

[11] Patent Number: 5,406,183
[45] Date of Patent: Apr. 11, 1995

[54] INTEGRATED REVERSIBLE LOAD CONTROLLER

[76] Inventor: Joseph F. Tomovic, 3861 Rolling Acres Drive, Niagara Falls, Ontario, Canada, L2J 3C2

[21] Appl. No.: 122,882

[22] Filed: Sep. 15, 1993

[51] Int. Cl.6 .............................................. H02J 7/00
[52] U.S. Cl. .................................... 318/696; 318/139; 318/280; 318/293
[58] Field of Search .................. 310/64; 318/396, 395, 318/139, 280, 287–293, 300

[56] References Cited

U.S. PATENT DOCUMENTS

| | | | |
|---|---|---|---|
| 3,084,319 | 4/1963 | Hooijkamp | 388/905 X |
| 3,447,056 | 5/1969 | Kosaka et al. | 388/824 X |
| 4,101,829 | 7/1978 | Gomperts et al. | 324/126 |
| 4,210,851 | 7/1980 | Wakamiya | 318/257 |
| 4,404,632 | 9/1983 | Harada et al. | 318/466 X |
| 4,412,160 | 10/1983 | Kojima et al. | 318/280 |
| 4,677,356 | 6/1987 | Tsuneda et al. | 318/138 |
| 4,769,557 | 9/1988 | Houf et al. | 307/147 |
| 4,840,222 | 6/1989 | Lakin et al. | 165/47 |
| 4,967,291 | 10/1990 | Touchton et al. | 360/78.04 |
| 4,972,128 | 11/1990 | Coullerut et al. | 318/265 |
| 4,972,129 | 11/1990 | Kawai et al. | 318/285 |
| 4,988,931 | 1/1991 | Tsukahara et al. | 318/293 |
| 5,119,011 | 6/1992 | Lambert | 318/139 X |
| 5,131,816 | 7/1992 | Brown et al. | 417/2 |
| 5,254,924 | 10/1993 | Ogasawara | 318/590 |

Primary Examiner—William M. Shoop, Jr.
Assistant Examiner—Brian Sircus
Attorney, Agent, or Firm—Dilworth & Barrese

[57] ABSTRACT

A load controller coupled to a load for generating and changing a load voltage including a polarity and a magnitude of the load voltage applied to the load. The load controller further includes a polarity selector, a processor, and a transistor module, and the load controller may be coupled to an interface including polarity controls and magnitude controls. The controller may further include a voltage converter coupled to a power source to provide operating power to the controller. The polarity selector responds to the polarity controls for generating a polarity signal exclusively at one of at least one output of the polarity selector. The processor includes a magnitude generator and at least one switch, with the magnitude generator responding to the magnitude controls for generating a magnitude signal. The at least one switch responds to the polarity signal from the at least one output of the polarity selector for switching the magnitude signal and a ground path between a first pair of contacts and a second pair of contacts of the transistor module. The transistor module responds to the switching of the magnitude signal and the ground path to one of either the first pair of contacts or the second pair of contacts by generating a load voltage; i.e. a voltage signal having a magnitude corresponding to the magnitude signal and having a direction or a polarity corresponding to the switching of the magnitude signal and the ground path to one of either the first pair of contacts or the second pair of contacts.

17 Claims, 6 Drawing Sheets

INTEGRATED REVERSIBLE LOAD CONTROLLER

FIELD OF THE INVENTION

This invention relates to load control systems and more particularly to reversible motor control systems.

BACKGROUND OF THE INVENTION

Industries and businesses employ advanced electronic equipment as well as medium-sized to miniature motors in production and other services. Servomotors are being utilized in smaller dimensioned applications, and miniature devices and nanomachines on a molecular level are finding many applications. The use of reversible voltages generated and controlled by small to miniature control systems including miniature circuits, integrated components and circuit boards and applied to a load in an application increases the versatility of many applications; for example, reversible direct current (DC) motors. Increasingly, however, the failure of integrated components on a circuit board requires replacement of the entire circuit board, thus wasting entire circuit boards having only one or a few integrated components actually needing replacement.

Replaceable plug-in components such as circuit boards as well as removable integrated circuit (IC) chips provide an advantage in preventing waste in wholesale replacement of electronics by allowing the replacement of smaller integrated components of the electronics instead.

For applications requiring reversible load control, electric or electromagnetic pulses, spikes, shorts, and burnouts may damage or destroy the components used in reversible load control. In some reversible load control applications, the reversal of voltages or currents in the components may damage or destroy the components. It is advantageous to implement reversible load control using small or miniature control systems avoiding the disadvantages of the reversal of voltages or currents, and further allowing the easy replacement of components in the event of damage.

OBJECTS, FEATURES AND ADVANTAGES OF THE INVENTION

An object of the invention is to provide an integrated reversible load controller for medium-sized to miniature load control applications.

An advantage of the invention is that it provides a load controller having a modular structure.

Another advantage of the load controller of the present invention is that it provides removable plug-in components for ease of replacement.

A feature of the load controller of the present invention is that it has a transistor module for driving a load.

An additional advantage of the load controller of the present invention is that it has a removable transistor module for facilitating replacement of the transistor module upon damage or defect of the transistor module.

A still further advantage is that the load controller has a removable transistor module including a built-in heat sink.

Another feature of the invention is that it provides a load controller having a polarity selector implementing an EXCLUSIVE-OR function to generate a polarity signal at either a first or a second output but not at both outputs simultaneously.

Another advantage of the load controller of the present invention is that it provides switches for switching a magnitude signal to one pair of transistors or to another pair of transistors but not to both pairs simultaneously.

Another object is to provide a load controller having a solid-state compact design.

SUMMARY OF THE INVENTION

The present invention comprises a load controller coupled to a load for generating and changing a load voltage including a polarity and a magnitude of the load voltage applied to the load. The load controller further includes a polarity selector, a processor, and a transistor module, and the load controller may be coupled to an interface including polarity controls and magnitude controls. The controller may further include a voltage converter coupled to a power source to provide operating power to the controller. The polarity selector responds to the polarity controls for generating a polarity signal exclusively at one of at least one output of the polarity selector.

The processor includes a magnitude generator and at least one switch, with the magnitude generator responding to the magnitude controls for generating a magnitude signal. The at least one switch responds to the polarity signal from the at least one output of the polarity selector for switching the magnitude signal and a ground path between a first pair of contacts and a second pair of contacts of the transistor module. The transistor module responds to the switching of the magnitude signal and the ground path to one of either the first pair of contacts or the second pair of contacts by generating a load voltage; i.e. a voltage signal having a magnitude corresponding to the magnitude signal and having a direction or a polarity corresponding to the switching of the magnitude signal and the ground path to one of either the first pair of contacts or the second pair of contacts. The transistor module applies the load voltage to at least two terminals of the load. As voltage is measured from a reference point, usually a ground or between two contacts or terminals, the polarity of the load voltage is determined with respect to a ground path; i.e. a conductive path to a ground.

BRIEF DESCRIPTION OF THE DRAWINGS

The features of the present invention will become more readily apparent and may be better understood by referring to the following detailed description of an illustrative embodiment of the present invention, taken in conjunction with the accompanying drawings, where.

DETAILED DESCRIPTION OF THE PREFERRED EMBODIMENTS

Figure 1:
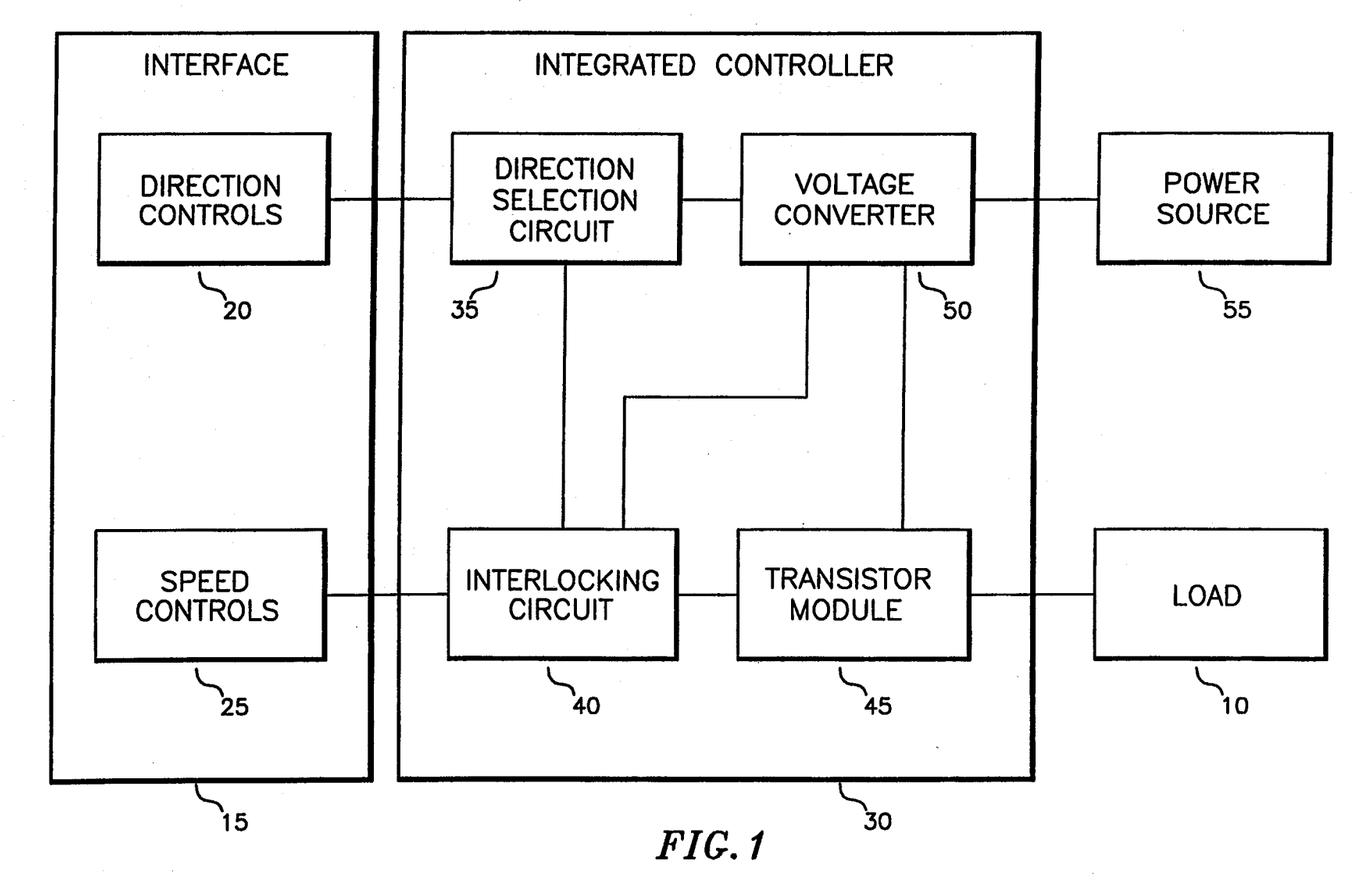
FIG. 1 shows a schematic of the integrated controller of the present invention.

Referring now in specific detail to the drawings, with like reference numerals identifying similar or identical elements, as shown in FIG. 1, the load controller is embodied as an integrated controller 30 having the polarity selector, the processor, the transistor module, and the voltage converter, embodied as the direction selection circuit 35, the interlocking circuit 40, the transistor module 45, and the voltage converter 50, with the voltage converter 50 coupled to the power source 55, the transistor module coupled to the load 10, the direction selection circuit coupled to the direction controls 20, and the interlocking circuit 40 coupled to the speed controls 25.

In a preferred embodiment, as shown in FIG. 1, the load 10 may be embodied as a DC motor which responds to a load voltage having a polarity and a magnitude for rotating an axle of the DC motor in a direction corresponding to the polarity of the load voltage and for rotating the axle of the DC motor at a speed corresponding to the magnitude of the load voltage. The interface 15 has polarity controls embodied as direction controls 20 for generating direction control signals, and the direction controls 20 may include push buttons or switches having at least one visual indicator such as FORWARD and STOP, FORWARD and OFF, or ON and OFF, to indicate to the user a direction which may be selected. Direction controls 20 indicating ON and OFF may be used to correspond to FORWARD and OFF, respectively.

For reversible motors, the direction controls 20 indicating FORWARD and REVERSE and, alternatively, FORWARD, REVERSE, and OFF, may be implemented. The interface 15 also has magnitude controls embodied as speed controls 25 which may include a knob or other devices having at least one visual indicator such as a range of speeds to indicate to the user a speed which may be selected.

Figure 2:
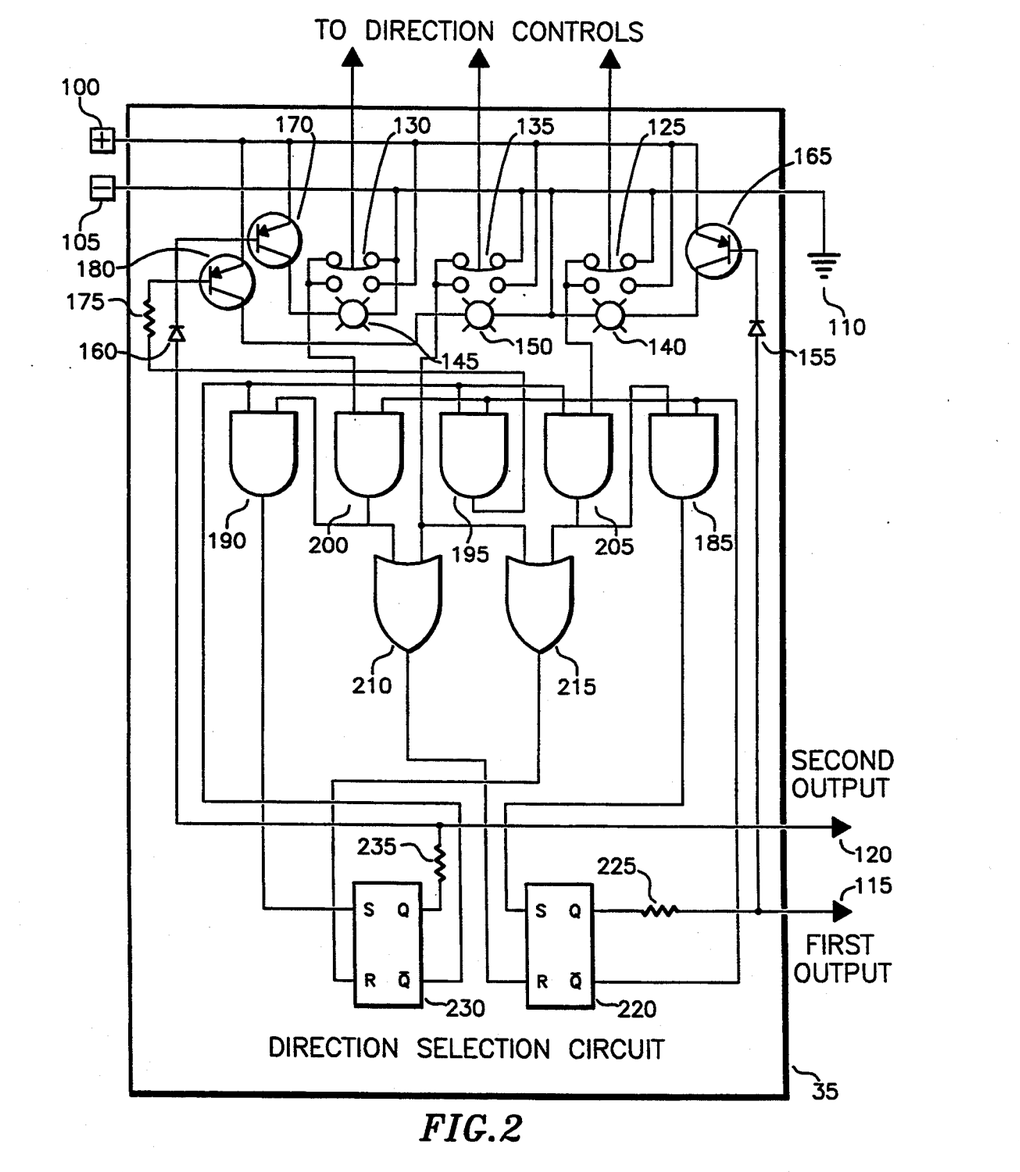
FIG. 2 shows a direction selection circuit.

As shown in FIG. 1, the polarity selector may be embodied as a direction selection circuit 35 coupled to the direction controls 20 and coupled to voltage converter 50 for generating at least one polarity signal. In an exemplary embodiment, as shown in FIG. 2, the direction selection circuit 35 responds to a user using the direction controls 20 for generating a polarity signal and outputting the polarity signal exclusively on a first output 115 or exclusively on a second output 120 depending on the direction selected by the user. In an exemplary embodiment, the direction selection circuit 35 includes a first switch 125, which is responsive to a first direction control signal, to switch the first switch 125. The direction selection circuit 35 responds to the switching of the first switch 125 and generates a polarity signal on the first output 115. The second output 120 remains inactive. A second switch 130 is provided and is responsive to a second direction control signal for switching second switch 130, and the direction selection circuit 35 responds to the switching of the second switch 130 by generating a polarity signal on the second output 120 and the first output 115 remains inactive. In response to a third direction control switching a third switch 135, the direction selection circuit 35 responds to the switching of the third switch 135 by generating no polarity signals either on the first output 115 or on the second output 120.

In the exemplary embodiment shown in FIG. 2, the direction selection circuit 35 includes a positive contact 100 coupled to a +5 VDC voltage source from the voltage converter 50 shown in FIG. 1, and includes a negative contact 105 coupled to a ground of the +5 VDC voltage source which is in turn coupled to a common ground 110 of the integrated controller 30. For the purpose of the present invention, a DC voltage greater than +2.5 VDC is defined as high or logical 1 and a DC voltage less than +2.5 VDC defined as low or logical 0, and the direction selection circuit 35 utilizes positive logic. In an inoperative position, each of the switches 125, 130, 135 is coupled to the common ground 110. Upon operating or switching each of the switches 125, 130, 135, respectively, each respective switch 125, 130, 135 couples a respective AND gate 185, 190, 195 to the +5 VDC voltage source to input a logical 1, respectively, to an input of each respective AND gate 185, 190, 195, respectively.

The direction selection circuit 35 includes a first flip-flop 220 and a second flip-flop 230, with each of flip-flops 220, 230 having a Set input, a Reset input, a first output labelled Q or $Q_1$, and a second output labelled $\overline{Q}$ or $Q_2$. Each of the flip-flops 220, 230 may be embodied as a RS 4013 flip-flop available from RADIO SHACK ® or other distributors. The output of AND gates 185, 190 are respectively coupled to the Set input of flip-flops 220, 230, respectively, and the second outputs of flip-flops 220, 230 are respectively coupled to an input of each of AND gates 185, 190, 200, and 205, as shown in FIG. 2. The output of AND gate 200 is coupled to an input of AND gate 190 and to an input of OR gate 210, and the output of AND gate 205 is coupled to an input of AND gate 185 and to an input of OR gate 215. Upon operation of a third direction control to generate a third direction control signal to switch the third switch 135, the third switch 135 couples the +5 VDC as a logical 1 to an input of OR gate 210 and OR gate 215. As shown in FIG. 2, AND gates 185–205 may be embodied as Signetics 7408 TTL AND gates, and OR gates 210, 215 may be embodied as Signetics 7432 TTL OR gates.

Each of the outputs of OR gates 210, 215 are respectively coupled to the Reset contact of flip-flops 220, 230, respectively, and each of the first outputs of flip-flops 220, 230 is respectively coupled through a respective resistor 225, 235 to the first output 115 and the second output 120, respectively. Resistors 225, 235 may be embodied as 1K Ohm 0.5 W resistors. As shown in Table 1 below, the direction selection circuit 35 generates a logical 1 as a polarity signal on the first output 115 and generates a logical 0 as no polarity signal on the second output 120 if and only if the first switch 125 is switched by the first direction control signal. Similarly, a logical 1 as a polarity signal is generated on the second output 120 and a logical 0 on the first output 115 if and only if the second switch 130 is switched by the second direction control signal. The switching of the third switch 135 by the third direction control signal generates a logical 0 on both the first output 115 and the second output 120.

TABLE 1

| | Logic Value | |
| --- | --- | --- |
| | First Output of Direction Selection Circuit | Second Output of Direction Selection Circuit |
| First Switch Switched | 1 | 0 |
| Second Switch Switched | 0 | 1 |
| Third Switch Switched | 0 | 0 |

The switches 125, 130, 135 may be embodied as push button switches, or alternatively, the switches 125, 130, 135 may be included in a single pole, double throw toggle switch, with the third switch 135 being the middle switch of the single pole, double throw toggle switch. In the preferred embodiment, the first switch 125 is coupled to a FORWARD direction control, the second switch 130 is coupled to a REVERSE direction control, and the third switch 135 is coupled to a OFF direction control, with indicators or markings on the direction controls reflecting the function of each of switches 125, 130, 135.

In an alternative embodiment, a single pole, double throw toggle switch is employed, having the third switch 130 as a middle setting between the first switch 125 and the second switch 135 as first and second settings of the single pole, double throw toggle. The first and second settings correspond to a FORWARD direction control and a REVERSE direction control, respectively, for a user to select a forward direction or a reverse direction of rotation of the axle of the DC motor, and the middle setting of the single pole, double throw toggle switch corresponds to an OFF direction control for a user to stop the rotation of the DC motor. The use of a single pole, double throw toggle switch always causes the direction selection circuit 35 to stop the DC motor before changing direction; i.e. from forward to reverse and vice versa, thus preventing damage to the DC motor from rapid reversal of direction and also preventing damage to the interlocking circuit 40 through rapid changes in voltage.

FIG. 2 illustrates exemplary logic for the direction selection circuit 35, but equivalent alternative logic may be employed to generate the polarity signals according to Table 1 above.

As shown in FIG. 2, the direction selection circuit 35 may include at least one indicator corresponding to the switching of at least one switch, thus indicating the direction selected by a user using the direction controls 20. In a preferred embodiment, the direction selection circuit 35 includes a first diode 155 coupled to the first output 115 and coupled to a transistor 165 for driving a first indicator 140 when the first output 115 is high; i.e. when the direction selection circuit 35, responsive to a user switching the first switch 125 corresponding to a FORWARD setting, generates a logical 1 or high signal as a polarity signal at the first output 115. Similarly, the direction selection circuit 35 may include a second diode 160 coupled to the second output 120 for driving a second transistor 170 to activate a second indicator 145 when a user switches the second switch 130 corresponding to a REVERSE setting. The direction selection circuit 35 may also include AND gate 195 having inputs coupled to each of the second outputs of flip-flops 220, 230, with the output of AND gate 195 coupled through a resistor 175 to drive a third transistor 180 to activate a third indicator 150. When the third switch 135 is switched corresponding to a user selecting a OFF setting, both of the first output 115 and second output 120 are low or logical 0; i.e. no polarity signal is generated on either of the first output 115 or the second output 120. Accordingly, the second outputs of both of the flip-flops 220, 230 are high or logical 1 when the third switch 135 is switched, resulting in the output of AND gate 195 going high and activating the third indicator 150 corresponding to the user selecting the OFF setting. Each of the indicators 140–150 may be embodied as light emitting diodes (LEDs).

In a preferred embodiment, the direction selection circuit 35 has each of the first diode 155 and the second diode 160 embodied as a 1N2069 diode; each of the first transistor 165, second transistor 170, and third transistor 180 embodied as a PNP switching transistor; and resistor 175 embodied as a 1K Ohm 0.5 W resistor. Alternatively, one skilled in the art would recognize that transistors 165, 170, 180 may be replaced with equivalent circuits including NPN transistors or field effect transistors (FETs).

In an inactive state with the third switch 135 switched corresponding to the OFF setting, the first outputs of both of the flip-flops 220, 230 is low or logical 0 and the second outputs of both of the flip-flops 220, 230 are high or logical 1, causing both of first output 115 and second output 120 to be low or logical 0. Upon switching of the first switch 125, corresponding to the FORWARD setting, the direction selection circuit 35 has the first and second outputs of flip-flop 220 set to logical 1 and logical 0, respectively, while the first and second outputs of flip-flop 230 remain logical 0 and logical 1, respectively, thereby outputting a logical 1 on the first output 115 as a polarity signal and a logical 0 on the second output 120 of the direction selection circuit 35. By using a single pole, double throw toggle switch for switches 125, 130, 135, the third switch 135 is switched intermediate of an opening of the first switch 125 and a switching or closing of the second switch 130 and vice versa, with the intermediate switching of the third switch 135 restoring the outputs of the flip-flops 220, 230 to the inactive state as described above.

By the logical symmetry of the direction detection circuit 35, upon switching the second switch 130, corresponding to the REVERSE setting, the first and second outputs of flip-flop 230 change to logical 1 and logical 0, respectively, with the first and second outputs of flip-flop 220 remaining unchanged at logical 0 and logical 1, respectively, thereby outputting a logical 1 on the second output 120 as a polarity signal and a logical 0 on the first output 115.

Equivalent alternative embodiments of the direction selection circuit 35 of the present invention may be implemented to output only a polarity signal on the first output 115 in a first setting, and to output only a polarity signal on the second output 120 in a second setting. For example, the direction detection circuit 35 may be embodied as illustrated in FIG. 6 or in an equivalent circuit.

Figure 6:
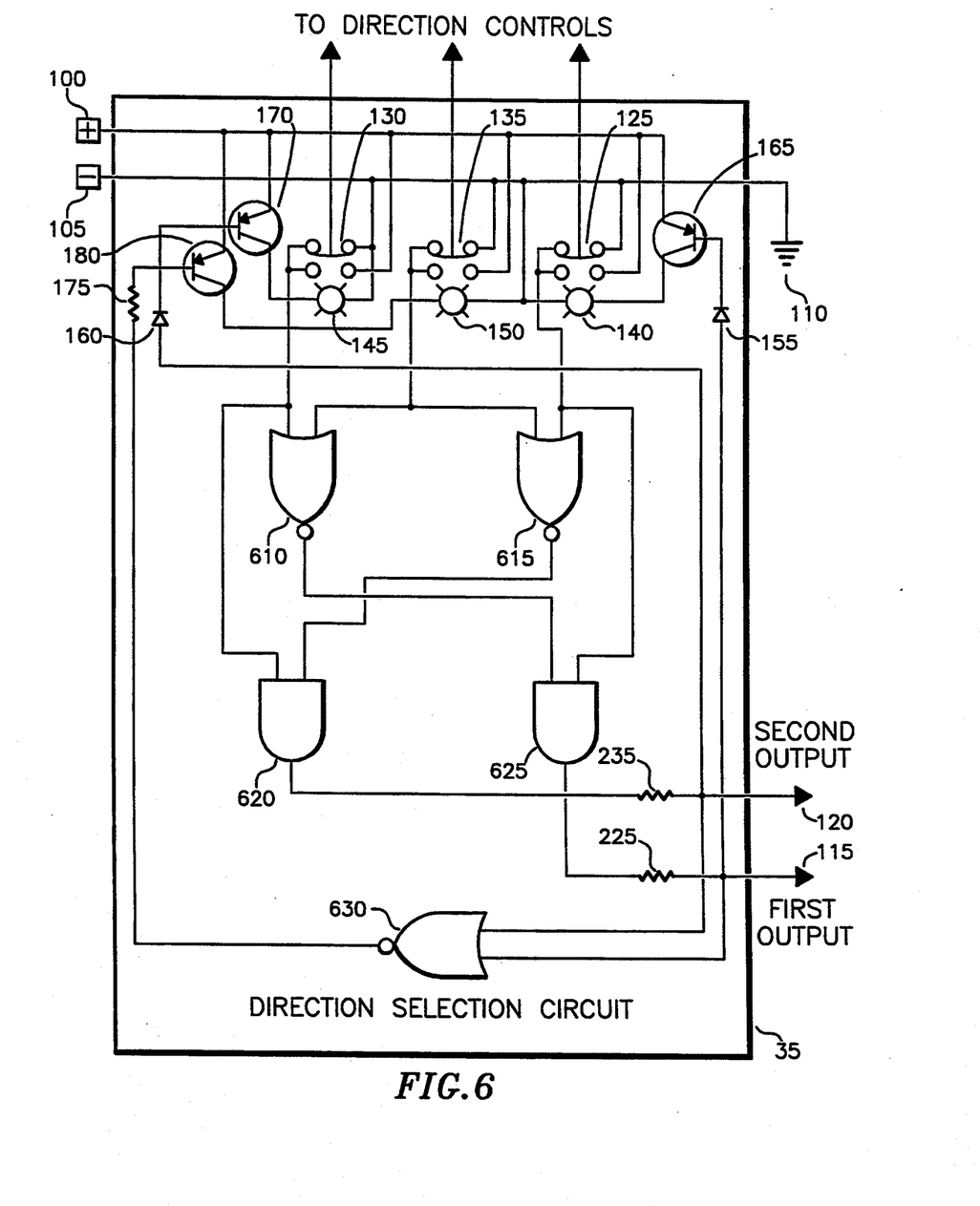
FIGS. 6-7 illustrate alternative embodiments of the direction selection circuit.

Similar to the direction selection circuit 35 shown in FIG. 2, the direction selection circuit 35 shown in FIG. 6 employs NOR gates 610, 615 coupled to switches 125–135 and coupled to AND gates 620, 625, and resistors 225, 235 coupled to AND gates 620, 625, respectively, to generate polarity signals in an EXCLUSIVE-OR function at first output 115 and second output 120 in accordance with Table 1 above. Polarity signals at outputs 115, 120 and diodes 155, 160 respectively activate transistors 165, 170, respectively, to drive indicators 140, 145, while NOR gate 630, resistor 175, and transistor 180 drive indicator 150 when no polarity signals are present at outputs 115, 120. As shown in FIG. 6, AND gates 620, 625 may be embodied as Signetics 7408 TTL AND gates, and NOR gates 610, 615, 630 may be embodied as Signetics 7433 TTL NOR gates. In the exemplary embodiment in FIG. 2, the direction selection circuit 35 outputs no polarity signals on a first output 115 and on a second output 120 in an inactive state or a third setting. Thus, the direction selection circuit 35 performs an EXCLUSIVE-OR function; i.e. outputting a polarity signal on a first output 115 or on a second output 120 if a polarity setting i.e. the first and second settings, is input to the direction selection circuit 35. No polarity signals are output simultaneously on both of the first output 115 and the second output 120, and also a lack of a polarity setting, i.e. the third setting is set or is in an inactive state, results in no polarity signals on either the first output 115 or the second output 120.

Figure 7:
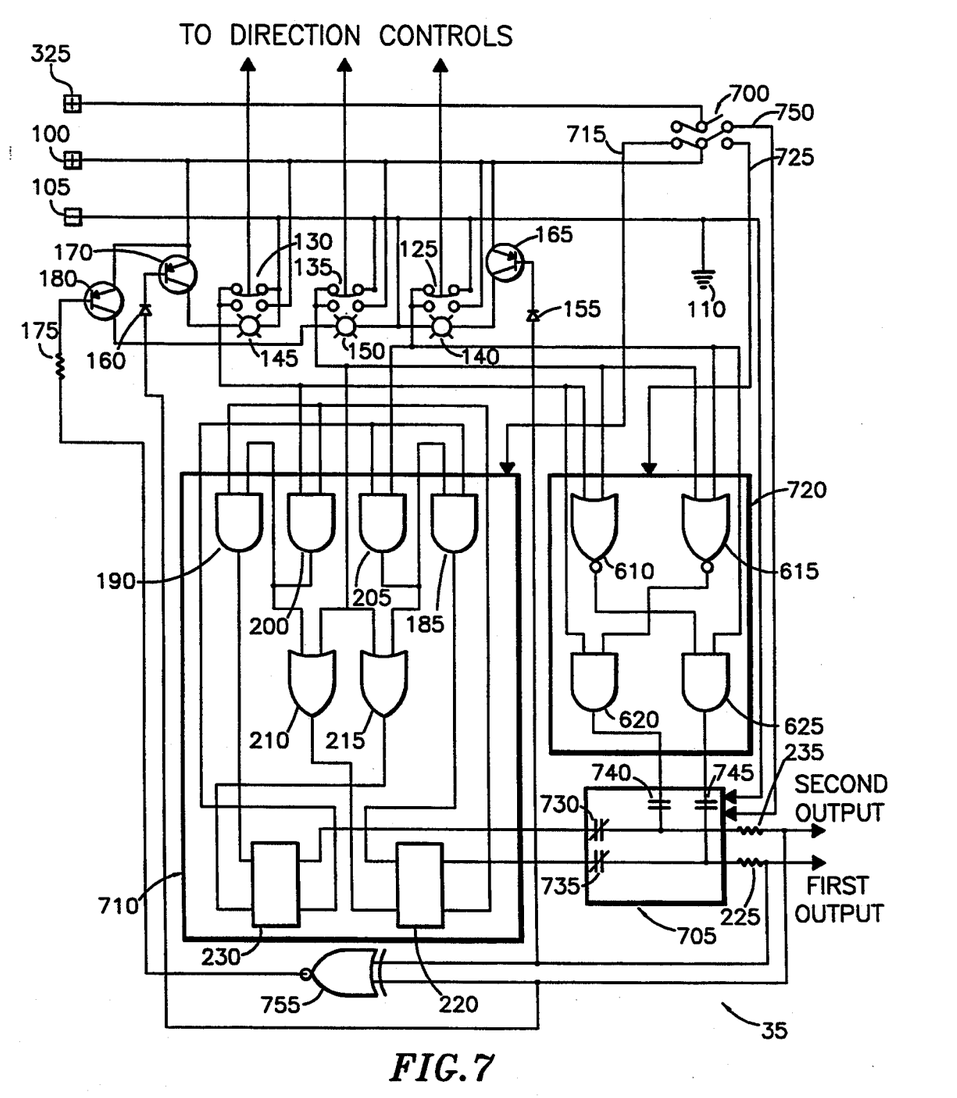

Alternatively, as illustrated in an exemplary embodiment in FIG. 7, the direction selection circuit 35 includes a first switch 700 for setting a load such as a DC motor to a RUN setting or to a JOG setting, a first selection circuit 710 for selecting a direction for running the DC motor, and a second selection circuit 720 for jogging the DC motor. A second switch 705, such as a ELEC-TROL® R5750-3 micro reed relay, is controlled by the first switch 700 to switch the outputs of the selection circuits 710, 720 to the first and second outputs of the direction selection circuit 35 provided to the interlocking circuit 40.

The first switch 700 may be a double pole, double throw switch for switching the +5 VDC operating voltage to either the first selection circuit 710 or the second selection circuit 720. Thus, in the RUN setting shown in FIG. 7, the +5 VDC operating voltage is provided through first switch 700 to logic gates 190-205 and flip-flops 220-230, while the +5 VDC operating voltage is cut off from logic gates 610-625 of the second selection circuit 720, so the first selection circuit 710 operates to select the running direction, and the second selection circuit 720 is inactive.

The first switch 700 in the RUN setting also cuts off the second switch 705 from the +12 VDC operating voltage through contact 325. The second switch 705 is inactive with contacts 730, 735 normally closed, coupling the outputs of the first selection circuit 710 through resistors 225, 235 to the first and second outputs of the direction selection circuit 35 and thus to the interlocking circuit 40. The contacts 740, 745 of the second switch 705 are normally open, cutting off the outputs of the selection circuit 720 from the direction selection circuit 35.

With the first switch 700 in the JOG setting (not shown), the first selection circuit 710 is cut off from the +5 VDC operating voltage, and so is inactive, while the +5 VDC operating voltage is provided to the second selection circuit 720, and the +12 VDC operating voltage is provided to activate the second switch 705. The activated second switch 705 opens contacts 730, 735 and closes contacts 740, 745 to couple the output of the second selection circuit 720 through resistors 225, 235 to the first and second outputs of the direction selection circuit 35, and thus to the interlocking circuit 40.

In this configuration, when the first switch 700 is set to the RUN setting, switches 125, 130 latch the flip-flops 220, 230 to run the load in the forward or reverse direction, respectively. Furthermore, when the first switch 700 is set to the JOG setting, switches 125, 130 jog the load through the second selection circuit 720 in the forward or reverse direction, respectively.

Each of the selection circuits 710, 720 generate direction signals on the first and second outputs of the direction selection circuit 35 in an EXCLUSIVE-OR function, as described above for the embodiments in FIGS. 2 and 6 and in accordance with Table 1 above. The direction signals on the first and second outputs turn on the appropriate indicators 140, 145 to indicate the forward or reverse directions selected in either RUN mode or JOG mode. The absence of direction signals on both the first and second outputs due to the OFF switch 125 being activated turns on the OFF indicator 150 using appropriate logic such as a NOR gate or an EXCLUSIVE NOR gate 755 as shown in FIG. 7. Gate 755 is provided with an operating voltage independent of the operating voltages supplied to selection circuits 710, 720, so the disabling of the selection circuits 710, 720 by first switch 700 does not disable gate 755 and the OFF indicator 150 functions in both RUN mode and JOG mode.

Each of the selection circuits 710, 720 generates an EXCLUSIVE-OR function to assure that one direction signal is supplied to either the first or the second outputs of the direction selection circuit 35. The first switch 700 and the second switch 705 assure that the load is controlled either automatically for continuous running or manually for jogging. Toggling the first switch 700 between the RUN and JOG settings alters the selected direction determined by switches 125-130. Therefore, a DC motor being jogged in the forward direction, for example, does not automatically run in the forward direction when the first switch 700 is toggled from JOG to RUN, since the first switch 700 had disabled first selector circuit 710 to operate second selector circuit 720 through the second switch 705.

The EXCLUSIVE-OR function of the direction selection circuit 35 is used to select a polarity of a load voltage to be applied to at least one terminal of load 10, corresponding to a user selecting a FORWARD setting or a REVERSE setting of a direction of rotation of the axle of a DC motor, with the direction of rotation allowing only one of two mutually exclusive rotations; i.e. clockwise and counterclockwise. For example, the FORWARD setting may correspond to a clockwise rotation of the axle of the DC motor. The OFF setting corresponds to no polarity of the load voltage i.e. a null voltage or a zero magnitude voltage is applied to the load 10, corresponding to no rotation of the axle of the DC motor so that the DC motor is in an inactive state.

Figure 5:
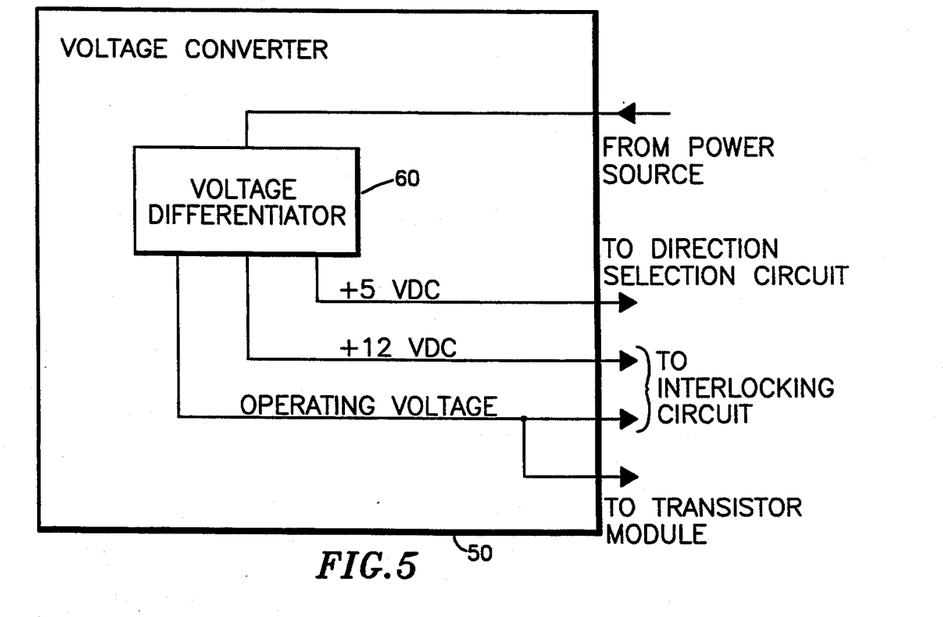
FIG. 5 illustrates a schematic of a voltage converter.

As shown in FIGS. 1 and 5, the integrated controller 30 of the present invention may further include a voltage converter, coupled to a power source 55 shown in FIG. 1, to provide power to the integrated controller 30. The voltage converter 50 includes a voltage differentiator 60 for generating a +5 VDC voltage for the direction selection circuit 35, generating a +12 VDC voltage for the interlocking circuit 40, and generating an operating voltage for the interlocking circuit 40 and for the transistor module 45. The load 10, such as DC motor, may operate at voltages higher than the voltages required by the integrated controller 30, so the operating voltage may, for example, range from +12 VDC to +180 VDC, with the minimum +12 VDC used as the operating voltage for the interlocking circuit 40, and the operating voltage may carry high currents; for example, 10 A for the load 10.

As shown in FIG. 1, the present invention includes a transistor module and a processor coupled to the transistor module, to the polarity selector, and to the magnitude selector. The processor includes a magnitude generator and at least one switch, with the magnitude generator responding to the magnitude controls for generating a magnitude signal. The at least one switch responds to the polarity signal from the at least one output of the polarity selector for switching the magnitude signal and a ground path between a first pair of contacts and a second pair of contacts of the transistor module. The transistor module responds to the switching of the magnitude signal and the ground path to one of either the first pair of contacts or the second pair of contacts by generating a load voltage having a magnitude corresponding to the magnitude signal and having a direction or a polarity corresponding to the switching of the magnitude signal and the ground path to one of either the first pair of contacts or the second pair of contacts. The transistor module applies the load voltage to at least one terminal of the load.

Figure 3:
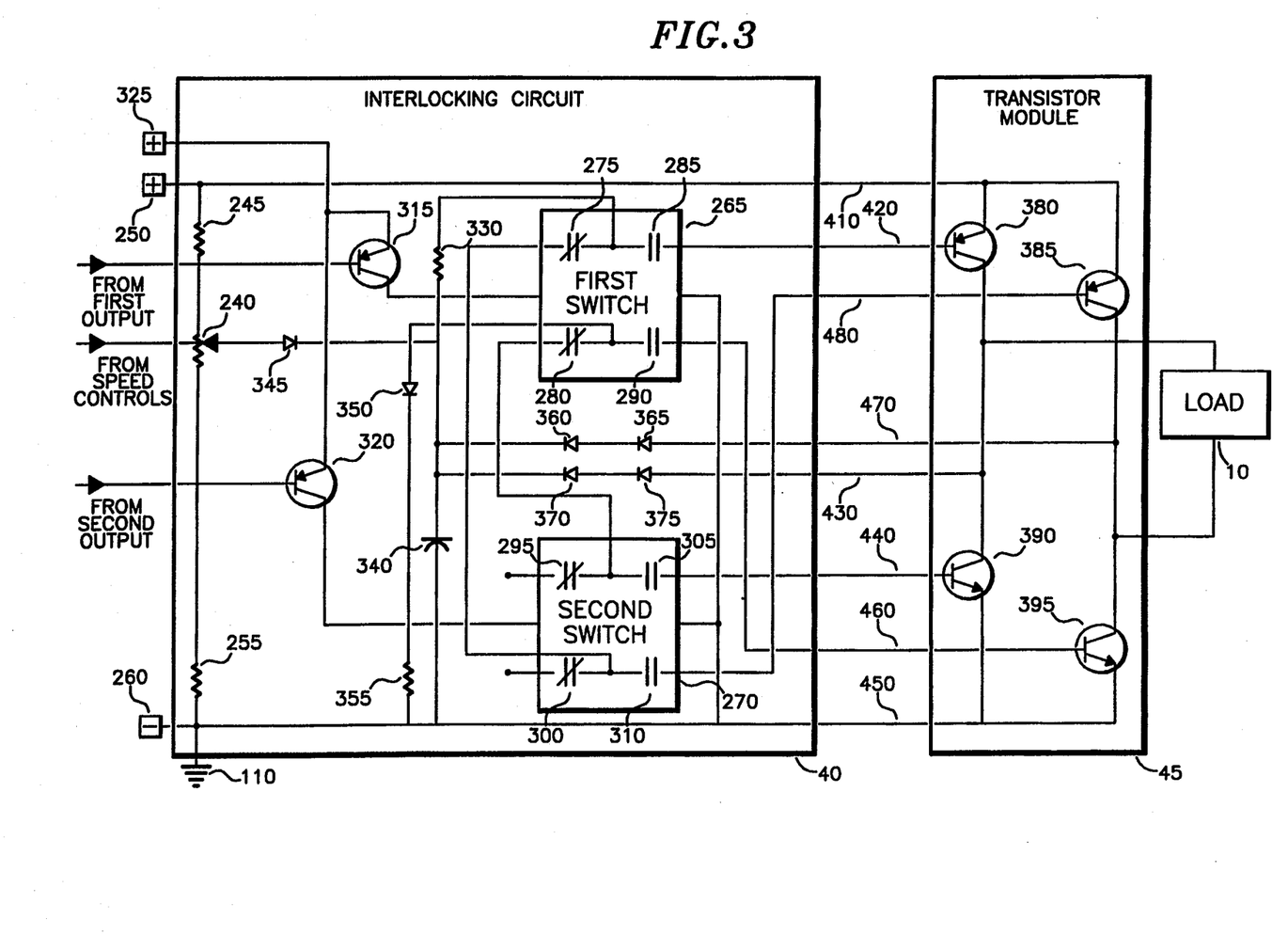
FIG. 3 illustrates an interlocking circuit and a transistor module.

In an exemplary embodiment, as shown in FIG. 1, the processor is embodied as an interlocking circuit 40 coupled to the transistor module 45, the direction selection circuit 35, the voltage converter 50, and the speed controls 25, and the transistor module 45 is coupled to the at least two terminals of load 10 which may be a DC motor. In an exemplary embodiment as shown in FIG. 3, the magnitude generator includes a potentiometer 240 coupled through a first resistor 245 to a first voltage input 250 from the voltage converter 50. The potentiometer 240 is also coupled through a second resistor 255 to a negative contact 260 to the voltage converter 50, with the negative contact 260 also coupled to the common ground 110. The operating voltage from the voltage converter 50 through the voltage input 250 serves as an operating voltage to be applied to the transistor module 45 for the load 10. In the exemplary embodiment, the potentiometer 240 is a 5K Ohm potentiometer, the first resistor 245 is a 380 Ohm 1 W resistor, and the second resistor 255 is a 220 Ohm 1 W resistor. The potentiometer 240 is coupled to the speed controls 25 embodied as a knob or other speed selecting devices for varying the resistance of the potentiometer 240 to generate a voltage as a magnitude signal corresponding to a speed of the DC motor selected by a user using the speed controls 25.

As shown in FIG. 3, the potentiometer 240 is coupled through a first diode 345, such as a 1N2069 diode, to a capacitor 340, such as a 0.5 μf 50 WVDC capacitor, and through a resistor 330, such as a 470 Ohm 0.5 W resistor, to a first switch 265. In the preferred embodiment, the first switch 265 includes a first micro reed relay having two normally closed contacts 275, 280, and two normally open contacts 285, 290. The first switch 265 may include a ELEC-TROL® R5750-3 micro reed relay. Resistor 330 is coupled to contacts 275, 285 of the first switch 265, and contacts 280, 290 of first switch 265 are both coupled through diode 350 and resistor 355 to the common ground 110. The second diode 350 may be a 1N2069 diode and resistor 355 may be a 100 Ohm 1 W resistor. The contact 285 of the first switch 265 is also coupled by contact 420 to transistor 380 of the transistor module 45 and contact 290 of the first switch 265 is coupled by contact 460 to transistor 395 of the transistor module 45.

The first switch 265 is activated by first transistor 315 coupled to a +12 VDC voltage source 325 from the voltage converter 50, and the first transistor 315 is driven by a polarity signal from the first output 115 of the direction selection circuit 35. The first switch 265, upon activation, opens contacts 275, 280 and closes contacts 285, 290, and, upon deactivation, returns to an inactive state with contacts 275, 280 closed and contacts 285, 290 open.

The interlocking circuit 40 also includes a second switch 270 embodied as a second micro reed relay having two normally closed contacts 295, 300 and two normally open contacts 305, 310. The second switch 270 may include a ELEC-TROL® R5750-3 micro reed relay. One terminal of contact 275 of the first switch 265 is coupled to contacts 300, 310 of the second switch 270, and one terminal of contact 280 of the first switch 265 is coupled to contact 295, 305 of the second switch 270 as shown in FIG. 3. One terminal of each of contacts 295, 300 is unused or open, and the other terminal of contacts 305, 310 are further coupled through contacts 440, 480, respectively, to transistors 390, 385, respectively, of the transistor module 45. The second switch 270 is activated by a second transistor 320 which is coupled to the +12 VDC voltage source 325 from the voltage converter 50, and the second transistor 320 is driven by a polarity signal from the second output 120 of the direction selection circuit 35. The second switch 270, upon activation, opens contacts 295, 300 and closes contacts 305, 310, and, upon deactivation, returns to an inactive state with contacts 295, 300 closed and contacts 305, 310 open.

In a preferred embodiment, transistors 315, 320 may be PNP switching transistors. However, one skilled in the art would recognize that transistors 315, 320 may be replaced by equivalent circuits including NPN transistors or FETs.

The interlocking circuit 40 also has the first voltage input 250 coupled through contact 410 to the transistor module 45, and has the common ground 110 coupled through contact 450 to the transistor module 45. In addition, the interlocking circuit 40 has at least one diode 360, 365 coupled between the capacitor 340 and a contact 470, and has at least one diode 370, 375 coupled between the capacitor 340 and a contact 430. Each of diodes 360, 365, 370, 375 may be 1N2069 diodes.

The transistor module 45 is coupled to the interlocking circuit 40 through contacts 410, 420, 430, 440, 450, 460, 470, 480, which may be embodied as electrically conductive pins. The transistor module 45 includes a first transistor 380 coupled to the first voltage input 250, to contact 430, to the load 10, and through contact 420 to contact 285 of the first switch 265. A second transistor 385 is coupled to the first voltage input 250, to contact 470, to the load 10, and through contact 480 to contact 310 of the second switch 270. A third transistor 390 is coupled to load 10, to contact 305 of the second switch 270 through contact 440, to contact 430, and to the common ground 110 through contact 450. A fourth transistor 395 is coupled to the load 10, to contact 290 of the first switch 265 through contact 460, to contact 470, and to the common ground 110 through contact 450. The transistors 380, 385, 390, 395 form an H bridge with the load 10, with transistors 380, 390 coupled to a first terminal of the load 10 and with transistors 385, 395 coupled to a second terminal of the load 10.

Figure 4:
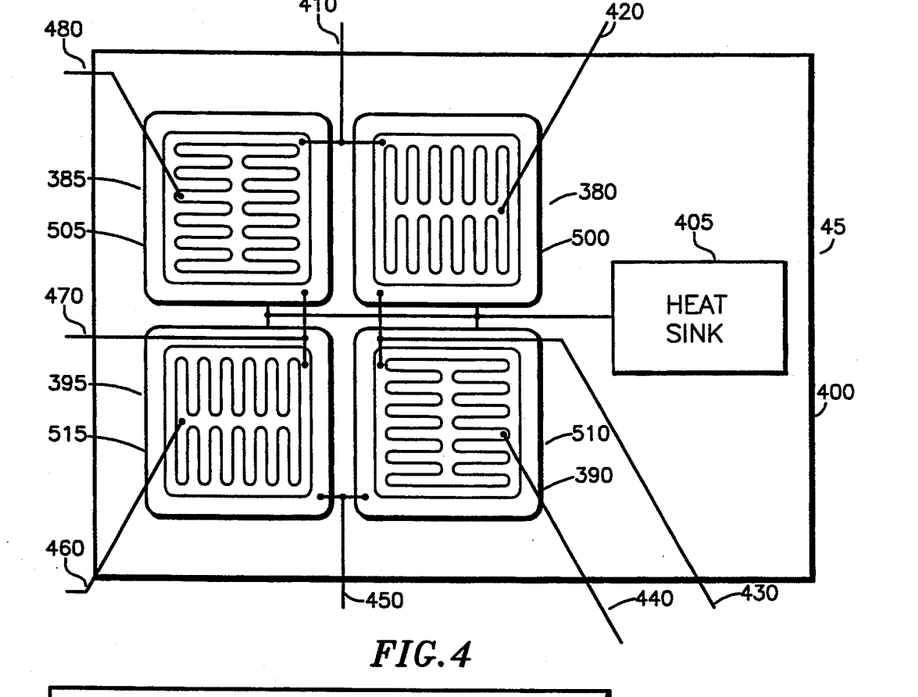
FIG. 4 shows a layout of the transistor module.

As shown in FIG. 4, the transistor module 45 is embodied as an electrically insulated shell 400 having a built-in heat sink 405 and having the transistors 380, 385, 390, 395 coupled to the plurality of contacts 410–480 in accordance with the connections in FIG. 3. The shell 400 may include a housing made of a multi-layered ceramic, copper, and zinc alloy, with a thermally conductive surface contacting the heat sink 405. Each of transistors 380–395 includes a respective housing 500, 505, 510, 515 respectively thermally coupled to the heat sink 405 built into the shell 400. Each of transistors 380–395 may be a power transistor embodied as integrated power circuit such as the MOTOROLA® MJ2501 IC or an equivalent IC embedded into the shell 400.

In a preferred embodiment, transistors 380, 385 are PNP transistors and transistors 390, 395 are NPN transistors, with the bases of transistors 380–395 coupled to contacts 420, 480, 440, 460, respectively, with the emitters of transistors 380, 385 coupled to contact 410, the emitters of transistors 390, 395 coupled to contact 450, the collector of transistors 380, 390 coupled to contact 430, and the collector of transistors 385, 395 coupled to contact 470. However, one skilled in the art would recognize that transistors 385–395 may be replaced by equivalent circuits including PNP transistors, NPN transistors, or FETs. The contacts 410–480 and the shell 405 may be integrated to form an eight pin plug of the transistor module 45, allowing the transistor module 45 to be removably mounted in the integrated controller 30 as shown in FIG. 1, with the transistor module 45 to be removably coupled between the interlocking circuit 40 and the load 10, allowing the transistor module 45 to be easily removed and replaced as needed.

As shown in FIG. 1, each of the direction circuit 35, interlocking circuit 40, and voltage converter 50 may be embodied as a single integrated circuit (IC) chip, so with the transistor module 45 embodied as a module having an eight pin plug, the integrated controller 30 may be implemented as a printed circuit board or IC chip configuration coupled to the interface 15, the power source 55, and the load 10, as shown in FIG. 1. The integrated controller 30 may further include a plurality of connectors, such as plugs and sockets, for removably coupling the components of the integrated controller 30; for example, the direction selection circuit 35 and the interlocking circuit 40, embodied as IC chips, may be plugged into or easily removed from a printed circuit board or IC chip configuration of the integrated controller to electrically connect the direction selection circuit 35 and the interlocking circuit 40 to the voltage converter 50 and the transistor module 45 allowing for ease of replacement of components.

In use, the integrated controller responds to an OFF setting of the direction controls 20 by having the direction control circuit 35 as shown in FIG. 2 generate no output; i.e. no polarity signals on either of the first output 115 or the second output 120. Transistors 315, 320 respond to the lack of polarity signals by maintaining the respective switches 265, 270 in a deactivated or inactive state, preventing any magnitude signal from the potentiometer 240 from being switched to the transistor module 45. Thus, the transistors 380–395 generate a null load voltage; i.e. a voltage across the load 10 having zero magnitude, resulting in the load 10 being in an inactive or inoperative state.

In response to a first setting, embodied as a FORWARD setting, of the direction controls 20, the direction selection circuit 35 as shown in FIG. 2 generates a polarity signal only at the first output 115 which drives only the first transistor 315 of the interlocking circuit 40 to activate the first switch 265; i.e. to open contacts 275, 280 and to close contacts 285, 290. The closed contact 285 couples the magnitude signal from the potentiometer 240 and through diode 345 and resistor 330 to contact 420 to drive transistor 380 of the transistor module 45, and the closed contact 290 forms a ground path from transistor 395 through contact 460 to diode 350 and resistor 355 to the common ground 110 to drive transistor 395. The opened contacts 275, 280 open the connections to the inactive second switch 270 to block signals to or through the inactive second switch 270. With the second switch 270 inactive, open contacts 305, 310 maintain transistors 385, 390 in an inactive state.

The switching of the first switch 265, causing transistors 385, 390 to be inactive with the magnitude signal being input to transistor 380, and with a ground path input to transistor 395, results in the transistor module 45 generating a load voltage having a magnitude corresponding to the magnitude signal and having a first polarity across the at least two terminals of the load 10, with the load 10 responding to the load voltage. In a preferred embodiment, the load 10 is a DC motor which responds to the first polarity by rotating the axle of the DC motor in a first or FORWARD direction, so the FORWARD setting at the direction controls 20 causes the DC motor to rotate the axle in the FORWARD direction.

Similarly, in response to a second setting, embodied as a REVERSE setting, of the direction controls 20, the direction selection circuit 35 generates a polarity signal only at the second output 120 which drives only the second transistor 320 of the interlocking circuit 40 to activate the second switch 270; i.e. to open contacts 295, 300 and to close contacts 305, 310, while the first switch 265 remains inactive with contacts 275, 280 closed. The closed contact 310 couples the magnitude signal from the potentiometer 240 and through closed contact 275, resistor 330, and diode 345 to contact 480 to drive transistor 385 of the transistor module 45, and the closed contact 305 forms a ground path from transistor 390 through contact 440 and through closed contact 280, diode 350, and resistor 355 to the common ground 110 to drive transistor 390. With the first switch 265 inactive, open contacts 285, 290 maintain transistors 380, 395 in an inactive state.

The switching of the second switch 270, causing transistors 380, 395 to be inactive, with the magnitude signal being input to transistor 385, and with a ground path input to transistor 390, results in the transistor module 45 generating a load voltage having a magnitude corresponding to the magnitude signal and having a second polarity across the at least one terminal of the load 10, with the load 10 responding to the load voltage. In the preferred embodiment, the load 10 is a DC motor which responds to the second polarity by rotating the axle of the DC motor in a second or REVERSE direction, so the REVERSE setting at the direction controls 20 causes the DC motor to rotate the axle in the REVERSE direction.

For the switching of the first switch 265 and the second switch 270, the interlocking circuit 40 provides low currents to drive transistors 380, 385, respectively; for example, in a preferred embodiment, when each of transistors 380, 385 are fully loaded, the first switch 265 and the second switch 270, respectively, provide approximately 3 mA to drive the transistors 380, 385, respectively, to drive the load 10.

The capacitor 340 coupled to the potentiometer 240 and diode 345 generates a reference voltage corresponding to the magnitude signal sent to the transistor module 45 through an activated one of either the first switch 265 or the second switch 270, and diodes 360–375 coupled to capacitor 340 provide feedback of the transistor module 45 to the reference voltage, causing the transistors 380–395 of the transistor module 45 to drive the load 10 smoothly, thereby eliminating a hunting of a speed of a DC motor as a load 10.

As the switching of the first switch 265 and the second switch 270 are mutually exclusive due to the EX- CLUSIVE-OR function of the direction selection circuit 35, and since each of the first switch 265 and the second switch 270 includes a pair of open contacts when the second switch 270 and the first switch 265, respectively, is switching, the direction selection circuit 35 of FIG. 2 and the use of the first switch 265 and the second switch 270 of the interlocking circuit 40 of FIG. 3 insure that the transistor module 45 does not experience short circuits. In addition, as the second switch 270 is coupled to the magnitude signal through the normally closed contacts 275, 280 of the first switch 265, in case of a fault or an accidental activation of both the first switch 265 and the second switch 270, the activation of the first switch 265 opens contacts 275, 280, thereby blocking any magnitude signal from being coupled through the activated second switch 270; i.e. only the first switch 265 is effective upon a simultaneous activation of both switches 265, 270. Therefore, the EXCLUSIVE-OR function of the direction selection circuit 35, the mutually exclusive switching of switches 265, 270, and the default effectiveness of the first switch 265 upon accidental or faulty activation of both switches 265, 270 provides the load controller of the present invention with triple redundancy in safeguards against shorting out the transistor module.

While the invention has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

I claim:

1. A load controller for use with a DC motor for generating a load voltage across at least two terminals of the DC motor, the load controller comprising:
    a manually adjustable magnitude selector for selecting one of a range of magnitude settings;
    a polarity selector having at least two outputs and responsive to at least a first polarity setting for generating a polarity signal on one of the at least two outputs, the polarity selector responsive to a second polarity setting whereby the polarity signal is absent from any of the at least two outputs;
    a processor coupled to the manually adjustable magnitude selector and responsive to the manually selected magnitude setting for generating a magnitude signal corresponding to the manually selected magnitude setting, the processor includes at least one switch having at least one switching contact which is controlled by the polarity signal being on one of the at least two outputs of the polarity selector for activating the at least one switching contact to switch the magnitude signal to one of at least two transistor module contacts; and
    a transistor module having at least one transistor responsive to the switching of the magnitude signal for generating the load voltage across the at least two terminals of the DC motor, the load voltage having a magnitude corresponding to the magnitude signal and having a polarity controlling a direction of operation of the DC motor corresponding to the switching of the magnitude signal by the at least one switch of the processor to one of the at least two transistor module contacts.

2. The load controller as set forth in claim 1, wherein the processor further includes:
    the at least one switch for exclusively switching the magnitude signal to one of the at least two contacts.

3. The load controller as set forth in claim 1, wherein the at least one switch includes a reed relay.

4. The load controller as set forth in claim 1, wherein the transistor module is removably coupled to the processor and to the load.

5. The load controller as set forth in claim 4, wherein the transistor module includes:
    a shell having a heat sink thermally coupled to the at least one transistor; and
    at least one contact pin for removably electrically coupling the at least one transistor to the at least two contacts of the processor and for removably electrically coupling the at least one transistor to the at least two terminals of the DC motor.

6. The load controller as set forth in claim 1, wherein the polarity selector further includes:
    at least one visual indicator for visually indicating that a generated polarity signal is on one of the at least two outputs.

7. The load controller as set forth in claim 1, wherein the polarity selector further includes:
    a plurality of visual indicators having a first visual indicator, the first visual indicator for visually indicating the absence of the polarity signal from the at least two outputs.

8. A load controller for use with a DC motor for generating at least one load voltage across at least two terminals of the DC motor, the load controller comprising:
    a manually actuated magnitude selector for selecting one of a range of magnitude settings;
    a polarity selector having at least two outputs, responsive to a first polarity setting for generating a polarity signal on a first output, responsive to a second polarity setting for generating the polarity signal on a second output, and responsive to a third polarity setting whereby the polarity signal is absent from any of the first and second outputs;
    a processor coupled to the manually actuated magnitude selector and having means responsive to the manually selected magnitude setting for generating a corresponding magnitude signal, includes switching means having a plurality of switching contacts driven by the polarity signal being on the first output of the polarity selector for closing a first switching contact to switch the magnitude signal to a first transistor module contact, the switching contacts driven by the polarity signal being on the second output of the polarity selector for closing a second switching contact to switch the magnitude signal to a second transistor module contact; and
    a transistor module having at least one transistor responsive to the switching of the magnitude signal to the first transistor module contact and to the second transistor module contact, respectively, for generating a first load voltage and a second load voltage, respectively, across the at least two terminals of the DC motor, each of the first and second load voltages respectively having a magnitude corresponding to the magnitude setting and each of the first and second load voltages respectively having a polarity controlling a first and a second direction of operation of the DC motor corresponding to the first and second polarity setting, respectively.

9. The load controller as set forth in claim 8, wherein the processor further includes:
the switching means, responsive to the polarity signal being on a first and a second output, respectively, of the polarity selector, for switching the magnitude signal to the first and the second transistor module contact, respectively.

10. The load controller as set forth in claim 9, wherein the switching means includes:
a first switch for switching the magnitude signal to the first transistor module contact;
a second switch for switching the magnitude signal to the second transistor module contact; and
wherein the second and the first switch are respectively in an inactive state when the first and the second switches are switching, respectively.

11. The load controller as set forth in claim 8, wherein the transistor module is removably coupled to the processor and to the DC motor.

12. The load controller as set forth in claim 11, wherein the transistor module includes:
a shell having a heat sink thermally coupled to the at least one transistor; and
at least one contact pin as at least one of the transistor module contacts for removably electrically coupling the at least one transistor to the processor and for removably electrically coupling the at least one transistor to the at least two terminals of the DC motor.

13. The load controller as set forth in claim 8, wherein the polarity selector further includes:
at least one visual indicator for visually indicating that the polarity signal is on one of the at least two outputs.

14. The load controller as set forth in claim 8, wherein the polarity selector further includes:
a plurality of visual indicators having a first visual indicator for visually indicating the absence of the polarity signal from the at least two outputs.

15. A method for controlling a DC motor using a load voltage, the method comprising the steps of:
selecting at least one polarity setting;
generating a polarity signal exclusively on one of at least one output corresponding to the at least one polarity setting;
setting a magnitude setting using a manually actuated magnitude selector;
receiving the magnitude setting and polarity signal at a processor;
generating a magnitude signal corresponding to the manually selected magnitude setting using the processor;
controlling a switch having at least one switch contact in the processor to close the at least one switch contact;
switching the magnitude signal through the closed switch contact to one of at least two transistor module contacts of a transistor module corresponding to the generating of the polarity signal exclusively on the one of the at least one output; and
generating the load voltage at the DC motor from the magnitude signal.

16. The method as set forth in claim 15, wherein the step of generating the load voltage includes the step of:
generating the load voltage having a polarity corresponding to the polarity setting from the switching of the magnitude signal to the one of the at least one output.

17. The method as set forth in claim 15, wherein the step of switching includes the steps of:
switching the magnitude signal using a first switch of a plurality of switches in the processor; and
continuing at least one switch in the processor of the plurality of switches in an inactive state.

* * * * *